US009030598B2

(12) United States Patent
Eromaki (10) Patent No.: US 9,030,598 B2
(45) Date of Patent: May 12, 2015

(54) OPTICALLY REFRACTING SURFACES (75) Inventor: Marko Eromaki, Tampere (FI)

(73) Assignee: Nokia Corporation, Espoo (FI)

( * ) Notice: Subject to any disclaimer, the term of this patent is extended or adjusted under 35 U.S.C. 154(b) by 66 days.

(21) Appl. No.: 13/989,482

(22) PCT Filed: Nov. 24, 2010

(86) PCT No.: PCT/FI2010/050959
§ 371 (c)(1),
(2), (4) Date: Jun. 24, 2013

(87) PCT Pub. No.: WO2012/069689
PCT Pub. Date: May 31, 2012

(65) Prior Publication Data
US 2013/0314591 A1 Nov. 28, 2013

(51) Int. Cl.
H04N 5/225 (2006.01)
G02B 1/12 (2006.01)
B29C 67/00 (2006.01)
B29D 11/00 (2006.01)
G02B 13/00 (2006.01)
G02B 17/00 (2006.01)
G02B 21/00 (2006.01)
G02B 23/00 (2006.01)
H01L 21/00 (2006.01)

(52) U.S. Cl.
CPC . G02B 1/12 (2013.01); B29C 67/00 (2013.01); B29D 11/00009 (2013.01); G02B 13/001 (2013.01); B29D 11/00403 (2013.01)

(58) Field of Classification Search
CPC .......................................................... G02B 1/12
USPC ................................ 359/362–435; 438/29–47
See application file for complete search history.

(56) References Cited

U.S. PATENT DOCUMENTS

| 2002/0064341 | A1  | 5/2002  | Fauver et al. .................... 385/25 |
| 2007/0273054 | A1* | 11/2007 | Hernandez ..................... 264/1.7 |
| 2009/0090924 | A1  | 4/2009  | Klein et al. ...................... 257/98 |
| 2009/0186304 | A1* | 7/2009  | Liu ................................ 430/321 |
| 2010/0118182 | A1* | 5/2010  | Fujii et al. ...................... 348/374 |
| 2010/0157428 | A1* | 6/2010  | Wu et al. ........................ 359/622 |
| 2010/0284089 | A1  | 11/2010 | Shyu et al. ..................... 359/622 |
| 2011/0063731 | A1* | 3/2011  | Yamada et al. ............... 359/619 |

FOREIGN PATENT DOCUMENTS

JP 2001315217 11/2001

OTHER PUBLICATIONS

Hung et al.; "Electrostatic-Force-Modulated Microaspherical Lens for Optical Pickup Head"; Journal of Microelectromechanical Systems; vol. 17, No. 2; Apr. 2008; p. 370-380.
Kuo et al.; "Non-Spherical SU-8 Microlens Array Fabricated Utilizing a Novel Stamping Process and an Electro-Static Pulling Method"; Micro Electro Mechanical Systems; 2009; p. 987-990.

(Continued)

Primary Examiner — Christopher K Peterson
(74) Attorney, Agent, or Firm — Harrington & Smith (57) ABSTRACT A method includes producing a first layer of optical liquid, shaping contactlessly the first layer of the optical liquid according to a desired form, and curing the shaped first layer of the optical liquid with electromagnetic radiation to generate a first optically refracting surface.

19 Claims, 6 Drawing Sheets (56) References Cited

OTHER PUBLICATIONS

Hung et al., "Electrostatic-Force-Modulated Microaspherical Lens for Optical Pickup Head", Microelectromechanical Systems, Journal of; vol. 17, Issue 2; Apr. 2008; p. 370-380; abstract only.

Kuo et al., "Non-Spherical SU-8 Microlens Array Fabricated Utilizing a Novel Stamping Process, and an Electro-Static Pulling Method"; Micro Electro Mechanical Systems, 2009; Jan. 25-29, 2009; p. 987-990; abstract only.

* cited by examiner

OPTICALLY REFRACTING SURFACES

TECHNICAL FIELD

The present invention relates generally to optically refracting surfaces and, more specifically, to manufacturing method of such optically refracting surfaces and integrated optical systems.

BACKGROUND ART

Manufacturing of small lenses for camera modules involves several expensive and tolerance sensitive manufacturing solutions like injection moulding, plastic sheet pressing and lens replication by epoxy resin. Known methods include contact based, for example a physical, customized tool to produce required surface shape of the lens. Typically mould cavity or pressing head may be needed.

SUMMARY

According to a first example aspect of the invention there is provided a method comprising:
  producing a first layer of optical liquid;
  shaping contactlessly the first layer of the optical liquid according to a desired form; and
  curing the shaped first layer of the optical liquid with electromagnetic radiation to generate a first optically refracting surface.

The method may further comprise providing an isolation layer of non-curable material overlying the first optically refracting surface, producing a second layer of optical liquid overlying the isolation layer and shaping contactlessly the second layer of the optical liquid according to a desired form, curing the shaped second layer of the optical liquid with electromagnetic radiation to generate a second optically refracting surface, removing the isolation layer, and forming of the first and second optically refracting surfaces as an integrated optical system. The electromagnetic radiation may comprise ultraviolet light.

The isolation layer material may have higher mass density than the optical liquid. The optical liquid may comprise ultraviolet curable polymer and the isolation layer material may comprise at least one of the following: glucose, iodine and water.

The contactless shaping may comprise using an air flow blowed from a shaping head and adjusting the air flow from a nozzle of the shaping head. Enabling different air flow from mid-area nozzles of the shaping head than from edge-area nozzles of the shaping head may create a concave shape or a convex shape in the optical liquid.

The contactless shaping may comprise using electrostatic effect and controlling strength and a shape of an electrostatic field of the shaping head may shape at least one charged layer of the optical liquid. The contactless shaping may also comprise both using air blowed from a shaping head and using electrostatic effect.

An array of integrated optical systems may be formed, and after formed, the array may be divided into a plurality of integrated optical systems.

A digital image sensor may be provided underlying the first optically refracting surface and a vertical wall of the integrated optical system may be coated with a non-reflective material. The coating may also be opaque to reduce external light.

According to a second example aspect of the invention there is provided an optical system comprising:

a first optically refracting surface; and
a second optically refracting surface; wherein the first optically refracting surface and the second optically refracting surface are formed as an integrated optical system by curing of shaped optical liquid layers with electromagnetic radiation.

The electromagnetic radiation may be ultraviolet light. At least one chamber between the first optically refracting surface and the second optically refracting surface may be provided and an aperture extending to the chamber on the outer surface of the optical system may be included.

According to a third example aspect there is provided a camera module comprising the integrated optical system according to the second aspect.

A digital image sensor may be placed underlying the first optically refracting surface of the optical system and a non-reflective coating on a vertical wall of the integrated optical system may be placed to reduce ambient light reflections. The coating may also be opaque to reduce external light.

According to a fourth example aspect there is provided a computer program comprising computer executable program code configured to cause an apparatus to perform, on executing the program code, a method according to the first aspect.

According to a fifth example aspect there is provided a memory medium carrying the computer program of the third example aspect.

According to a sixth example aspect there is provided an apparatus configured to perform the method of the first example aspect.

Any foregoing memory medium may comprise digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
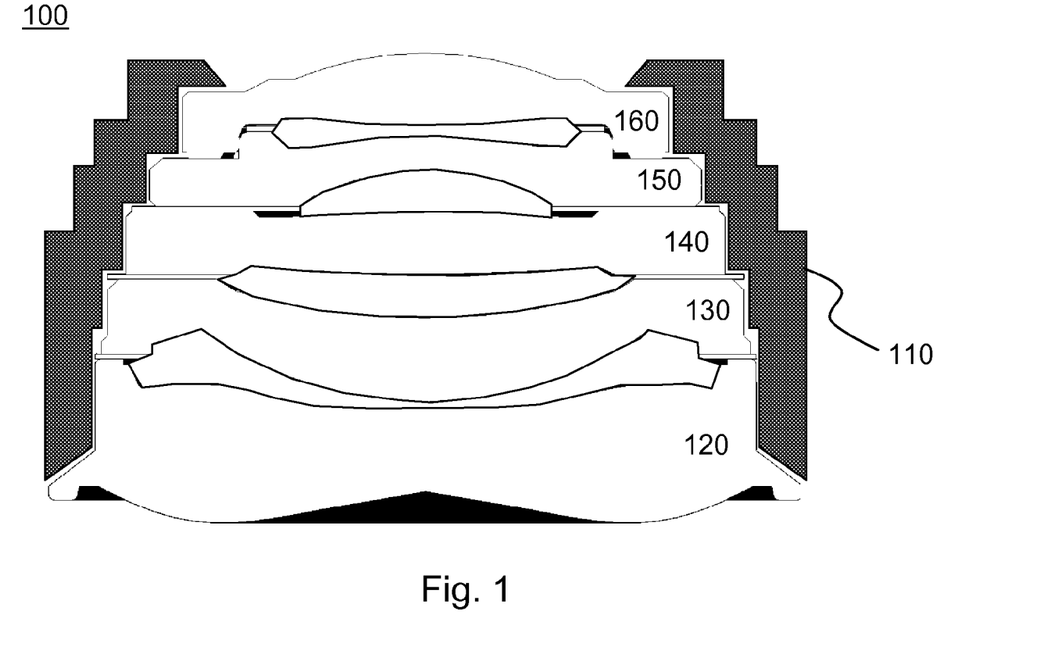
FIG. 1 shows some details of a lens system in accordance with a prior known solution.

FIG. 1 shows some details of a lens system 100 in accordance with a prior known solution. The lens system 100 comprises discrete lenses 120 to 160 and a lens barrel 110, which holds the lenses 120 to 160 in correct places.

In order to produce a camera module lens system with the conventional solution 100, moulding process needs typically accuracy of few micrometers. The moulding process may include injection moulding, for example. Such injection moulds with high accuracy are relatively expensive and their manufacturing time may be long. Also lifetimes for such moulds may be limited. Lens parameters like thickness, surface profile accuracy and decenter tolerance are critical. Further problems may rise when the discrete lenses 120 to 160 are assembled. Micrometer accuracy is needed for the assembly of the discrete lenses 120 to 160 inside the barrel 110. Separate, for example injection moulded, plastic or glass lenses 120 to 160 are stacked inside a hollow lens barrel 110. Each lens 120 to 160 is carefully inserted and aligned to its place. Required manufacturing and assembly tolerances are in the scale of few micrometers in order to achieve high optics quality. Parameters like lens-to-lens decenter and lens tilt (relative to image sensor, not shown) are critical. Assembly equipment needs to have high accuracy. Expensive active alignment equipment may need to be applied and automated assembly machines may need to be used. However, these factors slow down the manufacturing process result yield losses and capacity problems.

Figure 2:
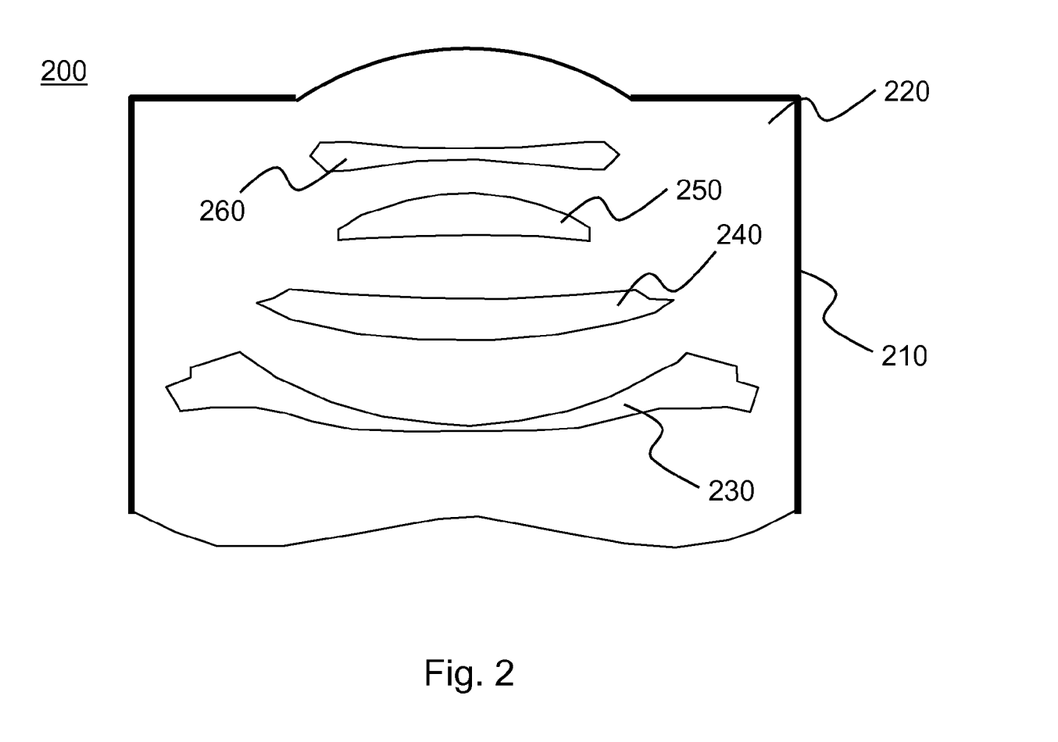
FIG. 2 shows a schematic drawing of an integrated optical system in accordance with an example embodiment of the invention.

FIG. 2 shows a schematic drawing of an integrated optical system 200 in accordance with an example embodiment of the invention. The integrated optical system 200 shows a single plastic block 220 containing built-in optical surfaces that are at least partially separated by hollow chambers 230 to 260. Manufacturing of such a block 220 is fast and every manufacturing step may be carried out in single stage. Assembly errors for the parts may be reduced and no moulds or moulding tools are needed, enabling shorter manufacturing schedule and less costs. Furthermore, lens generation and surfacing parameters may be adjustable with manufacturing control computer software enabling faster productization of the optical system, straightly from simulation software to the manufacturing machine. The single plastic block 220 of the integrated optical system 200 with optically refracting surfaces inside may be covered using a matte external coating 210 to prevent light reflections.

Figure 3A:
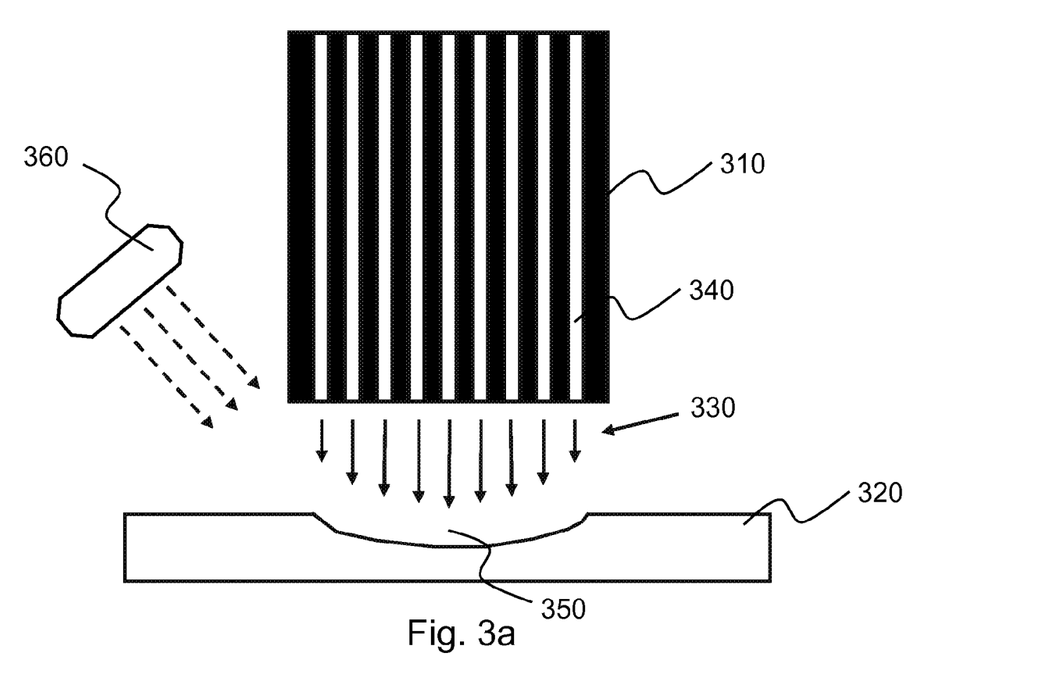
FIG. 3a shows a schematic drawing of manufacturing an optically refracting surface for an integrated optical system in accordance with an example embodiment of the invention.

FIG. 3a shows a schematic drawing of manufacturing an optically refracting surface for an integrated optical system in accordance with an example embodiment of the invention. A layer of optical liquid 320 may be provided. The optical liquid may be for example ultraviolet (UV) or visible light curing epoxy or other liquid polymer. Air pressure 330 from small nozzles 340 of a shaping head 310 may cause the surface of the optical liquid 320 change curvature. Higher air flow from the mid-area nozzles 340 may create concave lens shape 350 to the surface of the optical liquid 320. Once the required lens curvature 350 is produced with the air flow, the liquid material 320 may be cured with light from a light source 360. The light may be ultraviolet (UV) or visible light, for example. The field based surfacing may be used to produce any desired lens form using the similar process. Depending on the distance of the shaping head 310, pressure of air flow 330 and size of used nozzles 340, the optical surface corresponding to a lens may have convex, concave or some other form.

Figure 3B:
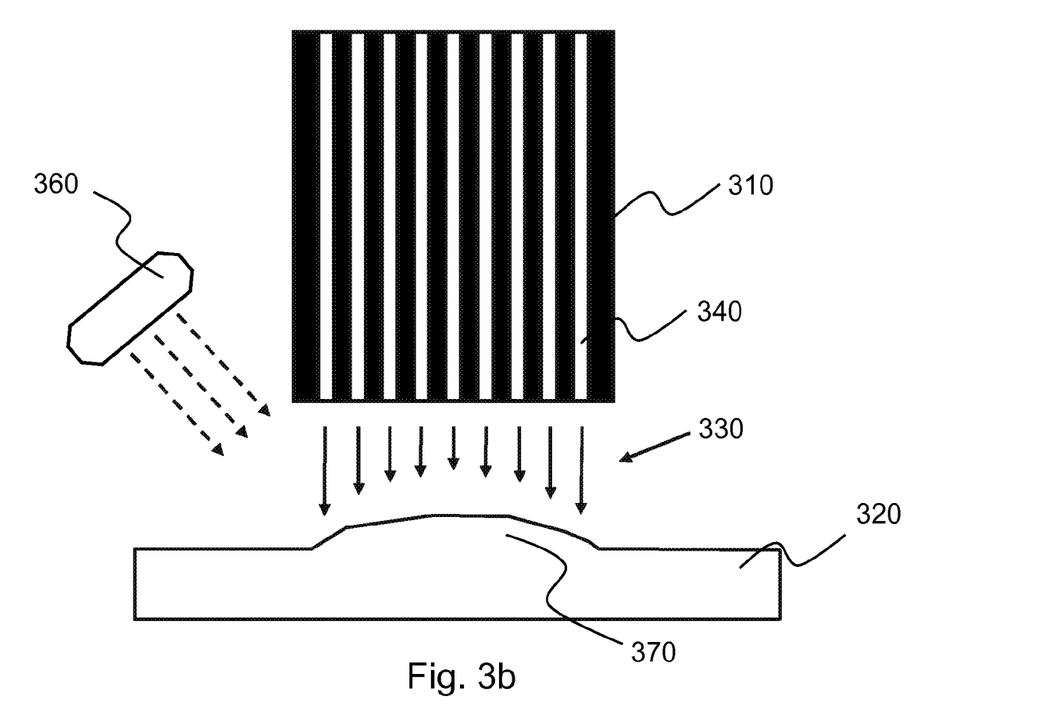
FIG. 3b shows a schematic drawing of manufacturing an optically refracting surface for an integrated optical system in accordance with another example embodiment of the invention.

FIG. 3b shows a schematic drawing of manufacturing an optically refracting surface for an integrated optical system in accordance with another example embodiment of the invention. A layer of optical liquid 320 may be provided. The optical liquid may be for example ultraviolet (UV) or visible light curing epoxy or other liquid polymer. Air pressure 330 from small nozzles 340 of a shaping head 310 may cause the surface of the optical liquid 320 change curvature. Higher air flow from the edge-area nozzles 340 may create convex lens shape 370 to the surface of the optical liquid 320. Once the required lens curvature 370 is produced with the air flow, the liquid material 320 may be cured with light from a light source 360. The light may be ultraviolet (UV) or visible light, for example.

Figure 4A:
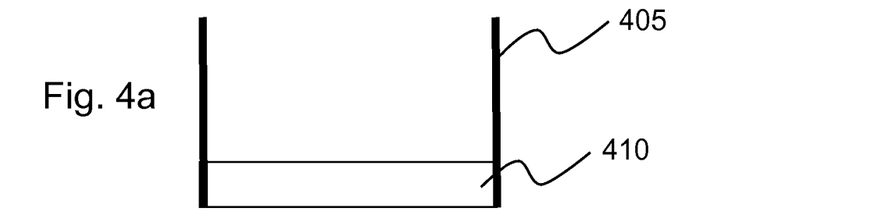
FIGS. 4a-f show a schematic drawing of manufacturing a stack of optically refracting surfaces for an integrated optical system in accordance with an example embodiment of the invention.
Figure 4B:
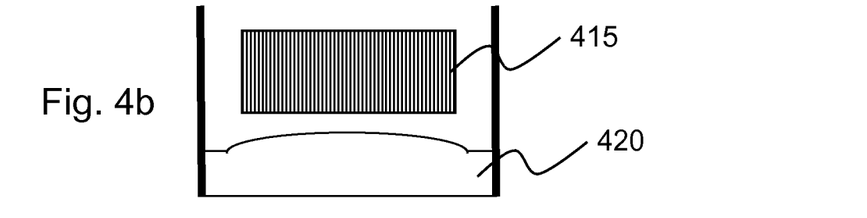

FIGS. 4a-f show a schematic drawing of manufacturing a stack of optically refracting surfaces for an integrated optical system in accordance with an example embodiment of the invention. In FIG. 4a, a first layer of optical liquid 410 is provided to the manufacturing tool 405. In next phase of FIG. 4b, the first layer of the optical liquid 410 may be shaped to a desired shape 420 using a shaping head 415, as described earlier in this application. After reaching the desired shape 420 for the first layer of the optical liquid, the shaped first layer 420 may be cured using a light source (not shown) to generate a first optically refracting surface 430. The light source may be emitting ultraviolet (UV) light or visible light.

Figure 4C:
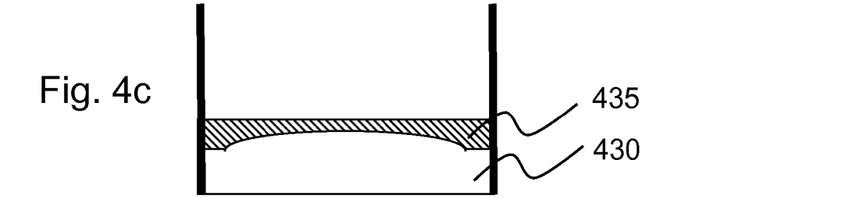
Figure 4D:
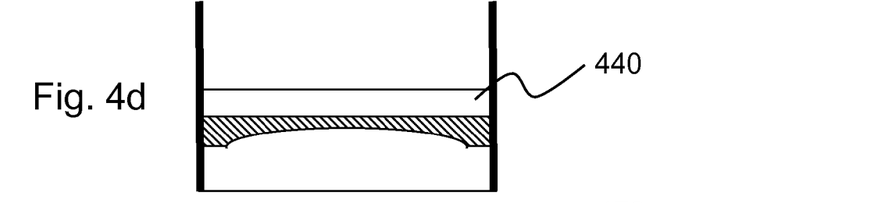

In accordance with an example embodiment of the invention, a liquid isolation layer 435 may be provided overlying the first optically refracting surface 430, as showed in FIG. 4c. After applying the isolation layer 435 of a non-curable liquid material, another layer of optical liquid 440 may be provided as showed in FIG. 4d. Lens curvature may be created and the resin cured for multiple successive layers as described earlier in this application.

Figure 4E:
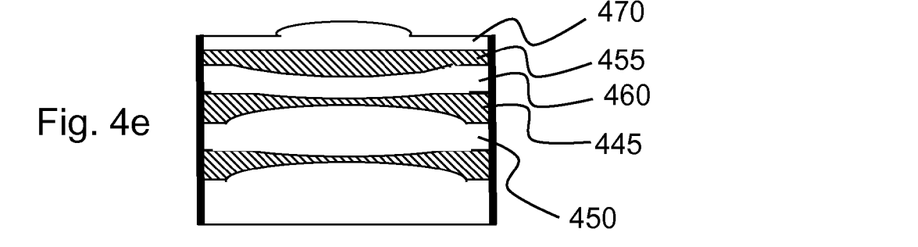
Figure 4F:
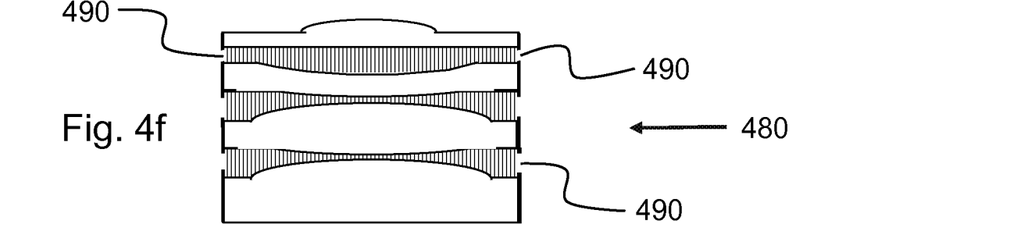

Thus, an optical stack of light refracting surfaces 430, 450, 460, 470 may be built as showed in FIG. 4e. The isolation layer 435, 445, 455 (liquid) material may be afterwards drained away from the system using apertures 490 between the optically refracting surfaces 430, 450, 460, 470 to be filled with air. Such draining may result in hollow chambers 230 to 260 as showed in FIG. 2. The final integrated optical system 480 in FIG. 4f may be produced in one manufacturing phase with single process equipment (one lens surfacing tool can produce any lens profile geometry). The apertures 490 may be safely added to opposite sides of the optically refracting surface walls in such a way that the apertures 490 do not interfere with the imaging area and do not affect the durability of the integrated optical system 480. The apertures 490 may also be used for cleaning the optically refracting surfaces 430, 450, 460, 470 with a liquid or air pressure, for example.

Amount of manufacturing errors or tolerance variations resulting from discrete parts or assembly may be reduced, no expensive tools are needed, no long manufacturing time for the tools is needed and yield losses may be reduced. Remaining parameter for the manufacturing accuracy may be the process capability, which can be optimized. The lens surfacing process may be controlled and adjusted by controlling software of the shaping head and the nozzles. Thus, process changes, adjustments or optimization may be done immediately providing time and cost savings.

In accordance with an example embodiment of the invention, the solution provided in FIGS. 4a-4f may perform both manufacturing and assembly required. Tools needed to create a stack of optical surfaces may have extended lifetime. Furthermore, the structure of the shaping head, for example, is not complex in structure but may comprise a small cylinder with internal hollow tubes. Same tool may produce any typical lens geometry and may not need to be replaced for this. Possible errors may be corrected on the fly by computing software. Manufacturing errors and accumulated tolerances may be minimized due to the use of a single process. Logistically, no transfer of parts between different factories or positions may need to be done since manufacturing and assembly stages are integrated. As a result, yield and capacity may be increased but process complexity and product cost may be reduced. Lifetime for the optical surface shaping head may be extended since the head is not in contact to the optical resin and may not cause wearing for the head.

Figure 5:
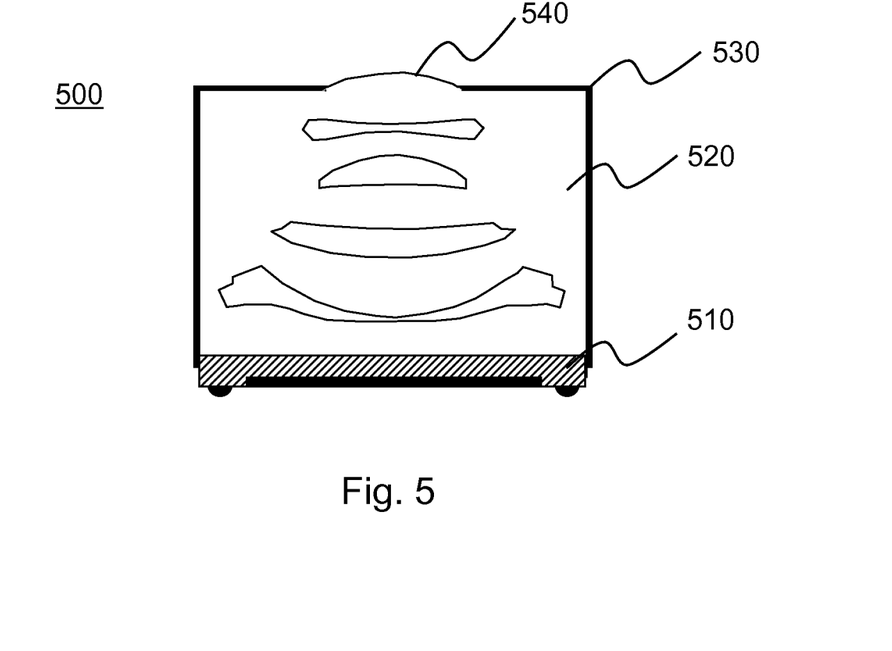
FIG. 5 shows a schematic drawing of building a camera module in accordance with an example embodiment of the invention.

FIG. 5 shows a schematic drawing of building a camera module 500 in accordance with an example embodiment of the invention. An image sensor 510 may be placed as a base component. The image sensor 510 comprises a sensor, a sensor substrate and some required hardware elements. Overlying the image sensor 510 a number of needed layers for an integrated optical system 520 may be produced. Finally, a coated surface 530 for preventing light reflections and leakages may be inserted, covering the camera module 500. Only the gap 540 for incoming light to the integrated optical system 520 may be left. Such camera module 500 may be manufactured in the same place and the same line may handle a creation of the camera module 500 on top of the image sensor 510.

In accordance with an example embodiment of the invention, an array of integrated optical systems may be formed on a large liquid polymer area. After such formation, the array may be divided into a plurality of integrated optical systems.

Figure 6:
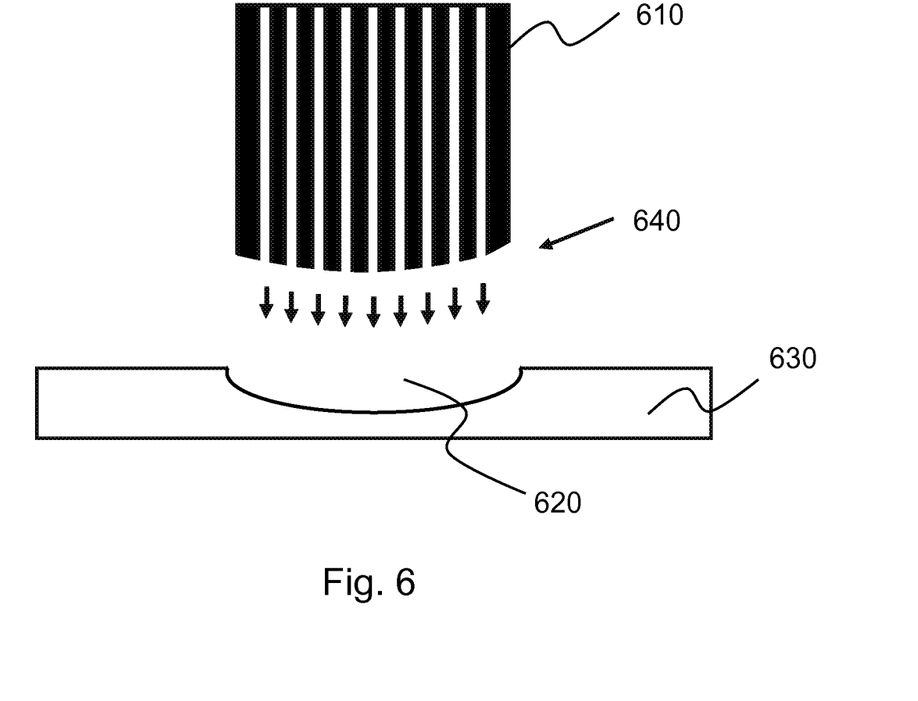
FIG. 6 shows a schematic drawing of modifying a shaping head in accordance with an example embodiment of the invention.

FIG. 6 shows a schematic drawing of modifying a shaping head 610 in accordance with an example embodiment of the invention. A desired shape 620 to an optical polymer resin 630 may be created by changing the shape of an effective end 640 of the shaping head 610. Thus, air cushion kind of effect may be created to prevent the optical polymer resin 630 to touch the shaping head 610. Small amount of air may be released through the nozzles of the shaping head 610 to produce air cushion but the curvature to the optical resin 630 is created based on the shape of the effective end 640.

Figure 7:
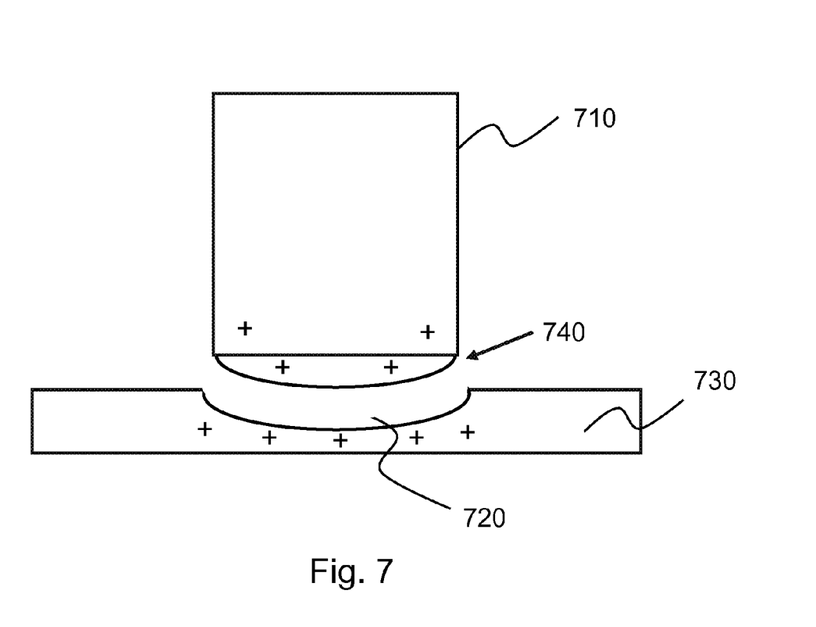
FIG. 7 shows a schematic drawing of modifying a shaping head in accordance with another example embodiment of the invention.

FIG. 7 shows a schematic drawing of modifying a shaping head in accordance with another example embodiment of the invention. A desired shape 720 to an optical polymer resin 730 may be created by changing the shape of an effective end 740 of the shaping head 710. In accordance with an example embodiment of the invention, an electrostatic effect may be used to prevent the optical polymer resin 730 to touch the shaping head 710. Both the shaping head 710, at least the effective end 740 of it, and the optical polymer resin 730 may be like charged either positively or negatively to cause shaping 720 to be created on the optical polymer resin 730.

Figure 8:
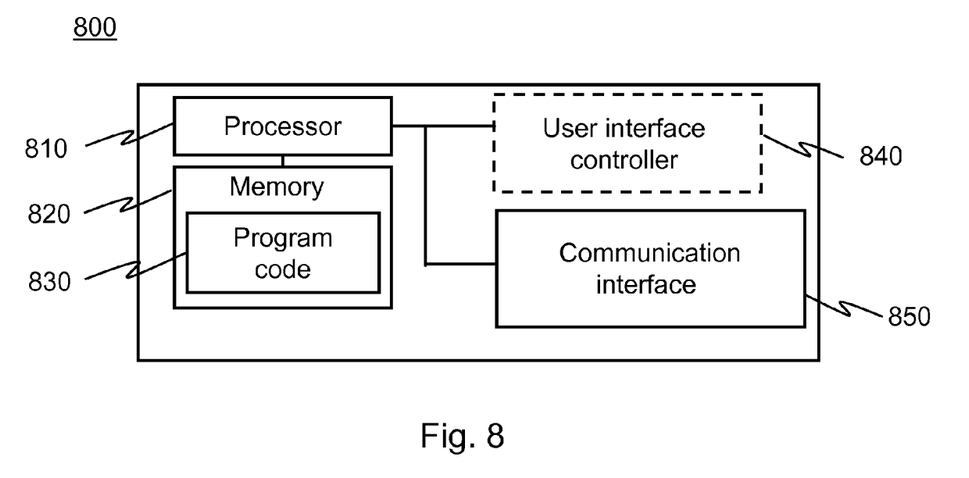
FIG. 8 shows an example block diagram of an apparatus in which various embodiments of the invention may be applied.

FIG. 8 shows an example block diagram of an apparatus 800 in which various embodiments of the invention may be applied. This may be a controlling computer for manufacturing tools, a personal computer, a controller or other processing device.

The general structure of the apparatus 800 comprises a communication interface module 850, a processor 810 coupled to the communication interface module 850, and a memory 820 coupled to the processor 810. The apparatus further comprises software 830 stored in the memory 820 and operable to be loaded into and executed in the processor 810. The software 830 may comprise one or more software modules and can be in the form of a computer program product. The apparatus 800 may optionally comprise a user interface controller 840 coupled to the processor 810.

The communication interface module 850 implements at least part of radio or fixed line data transmission. Manufacturing related data may be sent to the controlling computer 800 via the communication interface 850. Such data may comprise instructions of the integrated optical systems or camera modules needed or feedback of the earlier manufactured products, for example. The communication interface module 850 may be, e.g., a radio interface module, such as a WLAN, Bluetooth, GSM/GPRS, CDMA, WCDMA, or LTE (Long Term Evolution) radio module. The communication interface module 850 may be integrated into the apparatus 800 or into an adapter, card or the like that may be inserted into a suitable slot or port of the apparatus 800. The communication interface module 850 may support one radio interface technology or a plurality of technologies. FIG. 8 shows one communication interface module 850, but the apparatus 800 may comprise a plurality of communication interface modules 850.

The processor 810 may be, e.g., a central processing unit (CPU), a microprocessor, a digital signal processor (DSP), an image signal processor (ISP), a graphics processing unit, or the like. FIG. 8 shows one processor 810, but the apparatus 800 may comprise a plurality of processors.

The memory 820 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 800 may comprise a plurality of memories. The memory 820 may be constructed as a part of the apparatus 800 or it may be inserted into a slot, port, or the like of the apparatus 800 by a user. The memory 820 may serve the sole purpose of storing data, or it may be constructed as a part of an apparatus serving other purposes, such as processing data.

The user interface controller 840 may comprise circuitry for receiving input from a user of the apparatus 800, e.g., via a keyboard, graphical user interface shown on the display of the apparatus 800, speech recognition circuitry, or an accessory device, such as a headset, and for providing output to the user via, e.g., a graphical user interface or a loudspeaker.

A skilled person appreciates that in addition to the elements shown in FIG. 8, the apparatus 800 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 800 may comprise a disposable or rechargeable battery (not shown) for powering the apparatus 800 when external power if external power supply is not available. Stretch ability for the battery may be achieved by packing electrolyte fluids in a stretchable housing.

Figure 9:
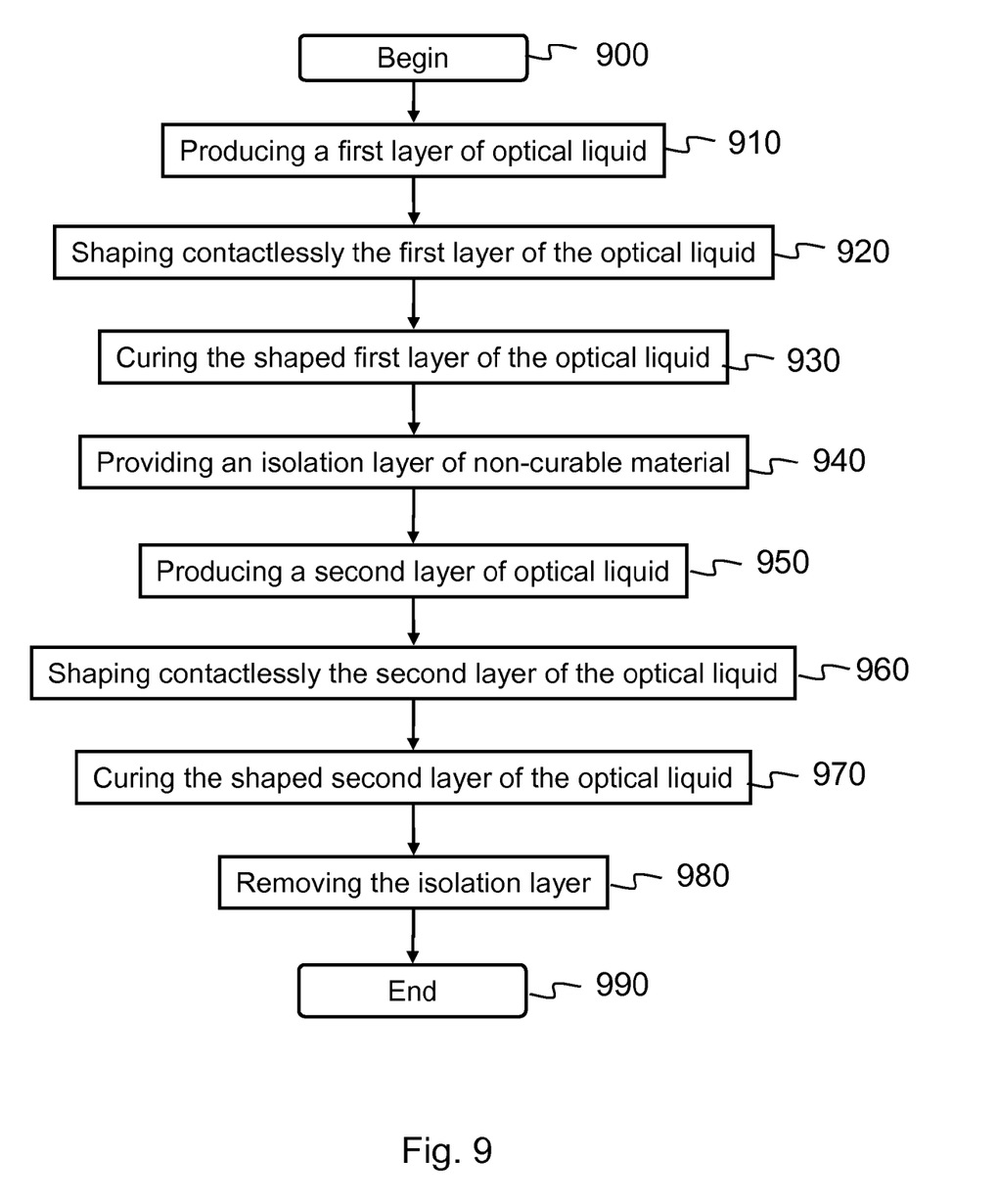
FIG. 9 shows a flow chart showing operations in an apparatus in accordance with an example embodiment of the invention.

FIG. 9 shows a flow diagram showing operations in an apparatus in accordance with an example embodiment of the invention. In step 900, the operation is started. In step 910, a first layer of optical liquid is produced. In step 920, the first layer of the optical liquid is contactlessly shaped according to a desired form. In step 9300, the shaped first layer of the optical liquid is cured with electromagnetic radiation to generate a first optically refracting surface. Next, an isolation layer of non-curable material is provided overlying the first optically refracting surface in step 940. In step 950, a second layer of optical liquid overlying the isolation layer is produced. In step 960, the second layer of the optical liquid is contactlessly shaped according to a desired form. The shaped second layer of the optical liquid is cured with electromagnetic radiation to generate a second optically refracting surface in step 970. In step 980, the isolation layer is removed, and an integrated optical system is formed of the first and second optically refracting surfaces. In step 990, the operation is ended.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:
producing a first layer of optical liquid;
shaping contactlessly the first layer of the optical liquid according to a desired form;
curing the shaped first layer of the optical liquid with electromagnetic radiation to generate a first optically refracting surface;
providing an isolation layer of non-curable material overlying the first optically refracting surface;
producing a second layer of optical liquid overlying the isolation layer;
shaping contactlessly the second layer of the optical liquid according to a desired form;
curing the shaped second layer of the optical liquid with electromagnetic radiation to generate a second optically refracting surface; and
removing the isolation layer, and forming of the first and second optically refracting surfaces as an integrated optical system.

2. The method of claim 1, wherein the electromagnetic radiation comprises ultraviolet light.

3. The method of claim 1, wherein the isolation layer material has higher mass density than the optical liquid.

4. The method of claim 1, wherein the optical liquid comprises ultraviolet curable polymer.

5. The method of claim 1, wherein the isolation layer material comprises at least one of the following: glucose, iodine and water.

6. The method of claim 1, wherein the contactless shaping comprises using an air flow blown from a shaping head.

7. The method of claim 6, further comprising adjusting the air flow from a nozzle of the shaping head.

8. The method of claim 7, further comprising enabling different air flow from mid-area nozzles of the shaping head than from edge-area nozzles of the shaping head for creating a concave shape or a convex shape in the optical liquid.

9. The method of claim 1, wherein the contactless shaping comprises using electrostatic effect.

10. The method of claim 9, further comprising controlling a strength and a shape of an electrostatic field of the shaping head so as to shape at least one charged layer of the optical liquid.

11. The method of claim 1, further comprising forming an array of integrated optical systems, and after formed, the array is divided into a plurality of integrated optical systems.

12. The method of claim 1, further comprising:
providing a digital image sensor underlying the first optically refracting surface; and
coating a vertical wall of the integrated optical system with a non-reflective material.

13. An apparatus configured to perform the method of claim 1.

14. An optical system comprising:
a first optically refracting surface; and
a second optically refracting surface; wherein the first optically refracting surface and the second optically refracting surface are formed as an integrated optical system by curing of shaped optical liquid layers with electromagnetic radiation in accordance with a method comprising:
producing a first layer of optical liquid;
shaping contactlessly the first layer of the optical liquid according to a desired form;
curing the shaped first layer of the optical liquid with electromagnetic radiation to generate a first optically refracting surface;
providing an isolation layer of non-curable material overlying the first optically refracting surface;
producing a second layer of optical liquid overlying the isolation layer;
shaping contactlessly the second layer of the optical liquid according to a desired form;
curing the shaped second layer of the optical liquid with electromagnetic radiation to generate a second optically refracting surface; and
removing the isolation layer, and forming of the first and second optically refracting surfaces as an integrated optical system.

15. The optical system of claim 14, further comprising at least one chamber between the first optically refracting surface and the second optically refracting surface.

16. The optical system of claim 15, further comprising at least one aperture extending to the chamber on the outer surface of the optical system.

17. A camera module comprising the integrated optical system of claim 14 and a digital image sensor underlying the first optically refracting surface of the optical system.

18. The camera module of claim 17, further comprising a non-reflective coating on a vertical wall of the integrated optical system.

19. A computer program product comprising a non-transitory computer-readable storage medium bearing computer program code embodied therein for use with a computer, the computer program code comprising code for performing the method of claim 1.

* * * * *